United States Patent [19]

Mueller et al.

[11] 3,715,666

[45] Feb. 6, 1973

[54] FAST START-UP SYSTEM FOR TRANSVERSAL EQUALIZERS

[75] Inventors: Kurt Hugo Mueller, Matawan; David Adams Spaulding, Colts Neck, both of N.J.

[73] Assignee: Bell Telephone Laboratories Incorporated, Murray Hill, N.J.

[22] Filed: March 30, 1971

[21] Appl. No.: 129,328

[52] U.S. Cl. ........................325/42, 325/65, 333/18, 178/69

[51] Int. Cl. ..............................................H03h 7/36

[58] Field of Search ....325/42, 65; 178/69 R, 69.5 R; 179/170.2; 328/165; 333/17, 18

[56] References Cited

UNITED STATES PATENTS 3,508,172 4/1970 Kretzmer et al. ........................333/18

3,614,622 10/1971 Holsinger ..............................325/42

*Primary Examiner*—Benedict V. Safourek
*Attorney*—Kenneth B. Hamlin

[57] ABSTRACT

Initial convergence of automatic transversal equalizer tap gain settings is rapidly achieved without first establishing synchronization between a test signal incoming at a receiving location over a distorting transmission channel and a locally generated ideal reference signal. Identical periodic digital patterns of fixed length equal to the number of taps available on the equalizer comprise the respective test and reference signals. Error signals obtained from a comparison of test and reference signals at an arbitrary speed which need not be related to the data rate assigned to the transmission channel are correlated with tap signals to obtain a sequence of coarse tap gain coefficients. Just prior to message data transmission this sequence is cyclically shifted with respect to the tap locations to align the highest of them at an assigned reference location.

9 Claims, 5 Drawing Figures

INVENTORS K. H. MUELLER
D. A. SPAULDING
BY J. P. Kearns
ATTORNEY

FAST START-UP SYSTEM FOR TRANSVERSAL EQUALIZERS

FIELD OF THE INVENTION

This invention relates in general to automatic equalizers for compensating distorting data transmission channels and in particular to rapid initial adjustment of such equalizers to channel characteristics.

BACKGROUND OF THE INVENTION

Intersymbol interference due to the overlapping of response components of consecutive signals is a serious impairment in synchronous digital data transmission over voiceband telephone channels. Some kind of automatic equalization is therefore necessary when transmitting high-speed data over such a channel with unknown characteristics. The equalizer generally consists of a transversal filter with adjustable tap coefficients or gain settings. These coefficients are set to initial values derived from test impulses or sequences transmitted through the transmission channel being used and are later updated by an adjustment algorithm adaptive to observations of received message signals. Since the distortion characteristics of telephone channels vary over a wide range depending on such factors as circuit length and media mix, a training period to determine initial values for equalizer adjustment to unknown channel distortion is required prior to message data transmission. Usually a set of pulses or a pseudorandom test pattern is transmitted in a training mode to learn the channel characteristics and adjust the equalizer coefficients as closely as possible to their optimum values. Initial values, once attained, can alternatively be frozen during subsequent message transmission or message data itself can be monitored to update the equalizer continuously and thus track slow time-varying channel characteristics in an adaptive mode.

In U.S. Pat. No. 3,292,110 issued Dec. 13, 1966 to F. K. Becker et al. automatic equalizers employing a training mode for initial adjustment are disclosed. In U.S. Pat. Nos. 3,368,168 issued Feb. 6, 1968 and 3,414,819 issued Dec. 3, 1968 to R. W. Lucky, details of representative adaptive equalizers are described.

If the response of the transmission channel to a single pulse and its noise characteristics are known to the receiver, the optimum tap gains can theoretically be calculated from a system of simultaneous equations. Automatic equalizers solve these equations by iterative algorithms, which lead to results of sufficient precision for practical use after a finite number of iterations. After initial adjustment, the receiver associated with the equalizer is ready for data reception.

In an increasing number of today's applications, high-speed data messages are transmitted in short bursts. Such applications occur in polling situations including airline reservation, inventory control and banking systems. Data set start-up time seriously limits the efficiency of such systems when it approaches or exceeds the actual message time.

The efficiency of a data transmission system relative to start-up time (neglecting roundtrip delays) may be defined as $$\varepsilon = T_M/(T_M + T_S), \quad (1)$$

where $T_M$ and $T_S$ are respectively message time and start-up time. A typical polling message of 120-bit length can be transmitted in time $T_M = 25$ milliseconds at a 4,800-bit-per-second rate. However, a representative data set (not arranged for fast start up) capable of this transmission rate needs the time $T_S$ = 5,000 milliseconds to start up. High-speed data sets themselves often require longer absolute start-up times because more sophisticated carrier and timing control as well as equalizer control are required. In this example 99.5 percent of the connection time for the message is needed for start up, while only 0.5 percent is used for actual information transfer. The effective transmission rate is thus only 24 bits per second. A much cheaper low-speed data set not requiring an equalizer could transmit the same message at a 30-bit-per-second rate and still allow a full second for start up.

For profitable employment of the high-speed data set the overall start-up time, allowing for carrier phasing, timing recovery and equalization, must be held to the range of about 10 to 20 milliseconds. It has been found that the parameters just mentioned are interdependent, but in practical systems start-up time is dominated by equalizer convergence time.

It is an object of this invention to achieve very rapid initial adjustment of automatic transversal equalizers in synchronous data transmission systems.

It is also an object of this invention to provide an ideal reference signal in an automatic equalizer without the need for prior synchronization.

It is a further object of this invention to improve initial convergence of automatic equalizers in highly distorted channels due to the availability of an ideal reference.

It is a still further object of this invention to obtain a set of initial tap gain settings for an automatic equalizer without first aligning them with specific taps.

It is another object of this invention to reduce initial start-up time in an automatic equalizer arbitrarily close to the time required to receive and store a test signal sequence having the same number of elements as there are taps on the equalizer.

It is still another object of this invention to perform initial equalization of an automatic equalizer at an accelerated iteration rate much higher than the symbol transmission rate.

SUMMARY OF THE INVENTION

According to this invention, initial tap gain coefficients for an automatic transversal equalizer are generated very rapidly by transmitting through the distorting transmission medium to be compensated and at the data symbol rate a pseudorandom periodic test pattern, the number of whose symbols is precisely equal to the number of equalizer taps, generating in the receiver a local reference sequence which is identical to the transmitted sequence except for an arbitrary time delay, comparing the transmitted sequence as it appears in the output of the equalizer with the local reference sequence, correlating the error signal resulting from such comparison with each equalizer tap signal to derive a set of tap coefficients, and cyclically shifting the set of tap coefficients to place the greatest of them at an assigned reference tap of the equalizer. To avoid bias during tap coefficient generation toward any particular tap, all tap coefficients are preferably brought to the same initial setting, e.g., zero.

In accordance with one aspect of this invention, the test sequences are generated continuously at both transmitting and receiving locations and compared at the equalizer output at the normal rate to be used for message data transmission.

In accordance with another aspect of the invention, one complete received test sequence is stored in the delay line, the delay line is made reentrant and the test sequence is circulated continuously through the delay line at a speed which optionally is the same as, or much greater than, the normal transmission rate. The local or reference sequence is generated at the same rate as the received test sequence.

The accelerated circulation rate is limited only by response and delay times inherent in practical amplifiers and multipliers. A circulation interval on the order of one microsecond does not appear to be unreasonable; equalization can thus take place extremely fast.

Once equalization has been achieved, independently of any syncronization between the test sequences and whether at the normal or an accelerated rate, and a set of tap coefficients which will yield an open data eye pattern has been obtained, a further shifting takes place to align the largest tap coefficient with the equalizer tap designated as the reference tap. Message data can now be processed by the equalizer at the normal symbol rate in an adaptive mode which will further reduce residual distortion and track slowly varying channel perturbations. This adaptive mode is realized by the expedient of replacing the locally generated reference sequence by a quantized form of the equalizer output when data messages are being received at the normal rate.

In a further aspect the received test sequence which has been subjected to the distorting effects of traversing the transmission medium can be fixedly stored in the equalizer delay line and the tap connections rotated among the tap gain elements. As before, when the set of tap coefficients has been obtained, the largest of them is aligned with the reference tap (usually the central tap) of the equalizer.

It is a feature of this invention that fast start-up performance for an automatic equalizer can be provided with minimal modification of the conventional structure.

It is another feature of this invention that its implementation is readily accomplished with digital circuitry.

DESCRIPTION OF THE DRAWING

The above and other objects and features of this invention will be better appreciated by a consideration of the following detailed description and the drawing in which.

DETAILED DESCRIPTION

Figure 3:
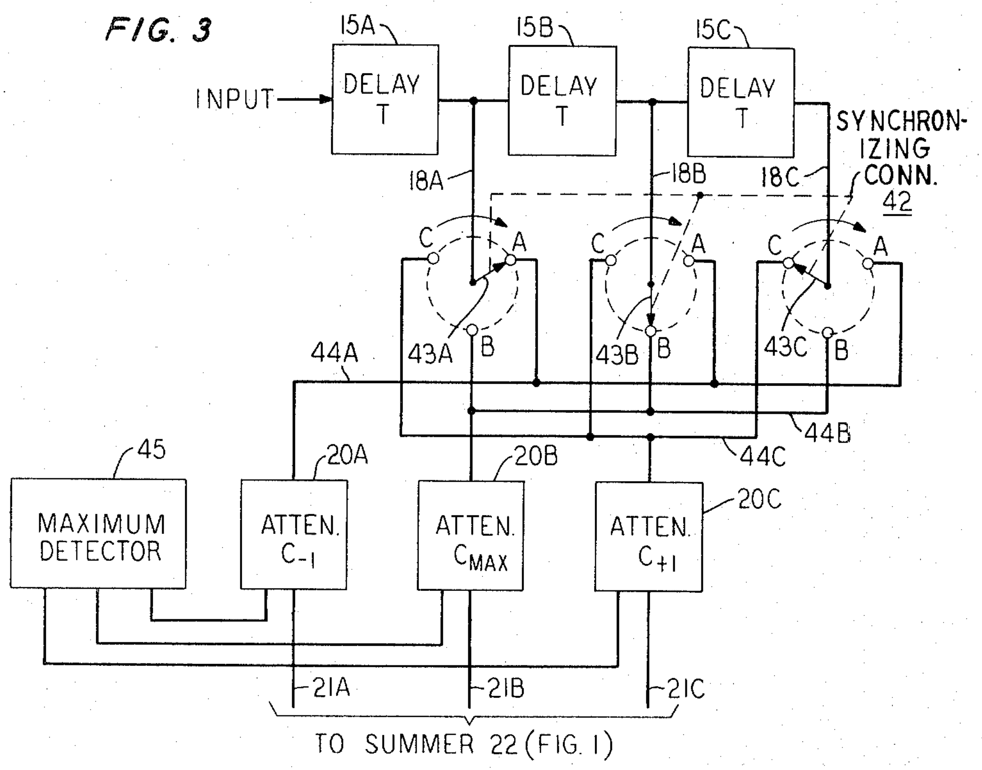
FIG. 3 is an alternative embodiment of a fast start-up system for an automatic transversal equalizer according to this invention.

Representative automatic equalizers are described by D. Hirsch and W. J. Wolf in a paper entitled "A Simple Adaptive Equalizer for Efficient Data Transmission" (*Transactions of the Institute of Electrical and Electronics Engineers on Communication Technology*, Volume Com-18, No. 1, February 1970 at pages 5 through 12). FIG. 3 of this paper illustrates the mean-square equalizer, a nonrecursive transversal filter structure provided with consecutive delays for an incoming signal equal to multiples of the symbol interval T. Signal samples picked off taps on the delay line at intervals T are selectively attenuated by adjustable tap coefficients in boxes G and combined in adder Σ. The difference between the actual adder output and a sliced or quantized version thereof constitutes an error signal *e* in the output of a subtractor (indicated by the downward pointing triangle). This error *e* is individually correlated in boxes X with the input and tap signal samples and averaged in boxes Σ to obtain control signals for automatic adjustment of the gain coefficients of attenuators G to obtain optimum performance.

Provided only that the received data eye pattern (observed on an oscilloscope synchronized at the symbol rate by superposition of consecutive signals) is open, the error between the actual and quantized outputs of the adder can be minimized adaptively. However, more typically the data eye is initially closed or is at best marginal. It is desirable to be able to receive the entire message signal and not lose those symbols which would be used in achieving equalization. Accordingly, a training mode is always provided. During this training mode, the reference signal necessary for equalizer operation is usually estimated by quantizing the equalizer output. It has been found, however, that convergence behavior can be seriously affected by this procedure if channel distortion is severe and initial error rate is high. To overcome this drawback and provide an ideal reference signal, identical digital sequences at the transmitter and the receiver can be synchronized, as explained for example in F. K. Becker et al. U.S. Pat. No. 3,403,340, granted Sept. 28, 1968. Unfortunately, the time consumed in obtaining synchronism between the two test signal trains can equal or exceed the time required for tap coefficient derivation.

We have discovered certain conditions under which synchronization of the two pseudorandom test sequences can be dispensed with and the time required for tap coefficient generation reduced by several orders of magnitude. The conditions are (1) that the pseudorandom test sequences exactly equal in symbol intervals the number of taps used in the equalizer, (2) that all tap coefficients are preset to identical initial valves, and (3) that the greatest tap coefficient can be sensed and all coefficients can be cyclically shifted to align the greatest of them with the delay line tap which is designated the reference tap.

If, in addition, one complete received pseudorandom test sequence is stored in the delay line, the iterative comparison process with the reference test sequence for tap coefficient derivation can be carried out at any arbitrary rate available, preferably at a rate higher than the symbol transmission rate.

Figure 1:
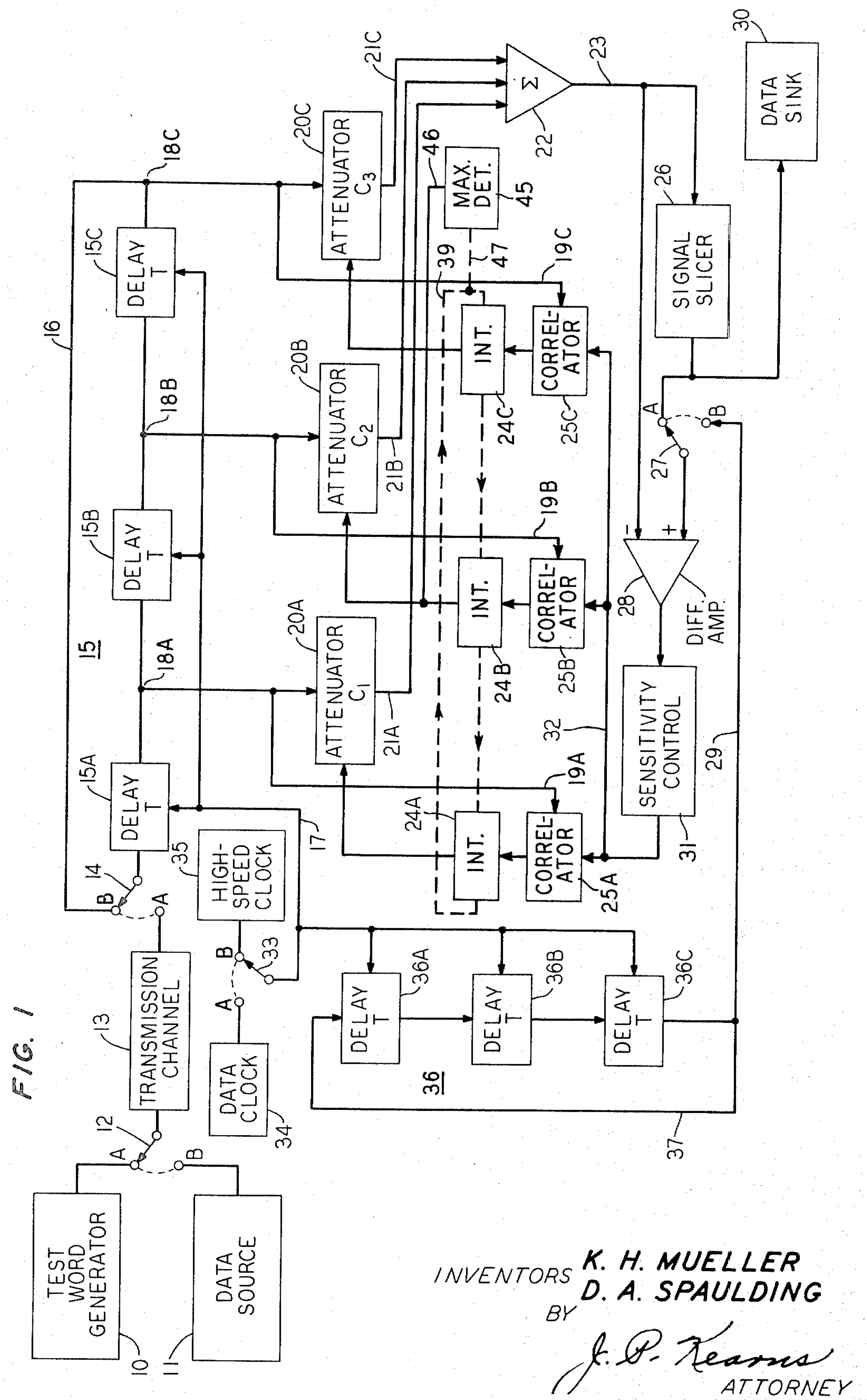
FIG. 1 is a schematic block diagram of the automatic transversal equalizer modified according to this invention for rapid start up.

With reference to FIG. 1 the conventional part of the equalizer structure comprises a delay line having T-delay elements 15 with a tap 18 at the right of each element; an adjustable attenuator 20 at each tap 18; an adder 22 for combining the attenuator outputs on leads 21; signal quantizer or slicer 26; difference amplifier 28; a correlator 25 associated with each tap 18; an integrator 24, each having an output for controlling a particular attenuator; and a data clock 34. The equalizer is depicted as operating at baseband and is associated with the receiving terminal of a data transmission system also including a transmission channel 13, a data source 11 and a data sink 30. The equalizer just outline operates adaptively as described in the Hirsch et al paper during message transmission to follow slowly varying channel characteristics.

Prior to message transmission, however, initial settings for attenuators 20 must be found to bring the equalizer within the adaptation range, i.e., the data eye must be opened. Where conventional initial settings are unity for the reference tap and zero for all others, it is preferable in accordance with this invention to bring all initial settings to a common value at or near zero.

The data eye can be opened in a conventional manner using synchronized pseudorandom generators at respective transmitting and receiving terminals, as shown in the cited Hirsch et al. paper. Typically, each such generator furnishes test words at an extended length unrelated to the number of equalizer taps. Generation of pattern lengths of 63 and 127 bits in common. Binary pseudorandom words can be generated in shift registers with feedback connections between at least two stages and another stage which may be regarded as the input. The word lengths so generated are related as $2^n-1$, where $n$ is the number of shift register stages. Three-stage data generator 36 in FIG. 1 represents such a local pseudorandom generator or one that recirculates a stored binary sequence. Test word generator 10 represents a similar generator located at the transmitting terminal. The ideal reference signal, which is available from the synchronized local word generator, improves equalizer convergence when the data eye is closed initially. In the prior art the best correlation was though to reside in long word-synchronized sequences clocked at the symbol rate. We have discovered that word synchronization of transmitter and receiver generated patterns can be dispensed with provided the word length is matched to the number of equalizer taps, all tap coefficients are preset to identical values, and final values of tap coefficients can be cyclically shifted in correct order to align the tap coefficient of maximum value with the reference tap. The shifting distance is equal to the delay between the unsynchronized received and locally generated test sequences.

Figure 2A:
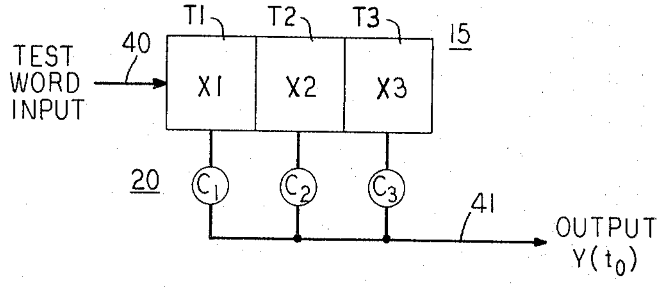
FIGS. 2A, 2B and 2C are simplified diagrams showing the conceptual interrelationships among circulated signal samples and tap-attenuator arrangements in an automatic transversal equalizer modified according to this invention.
Figure 2B:
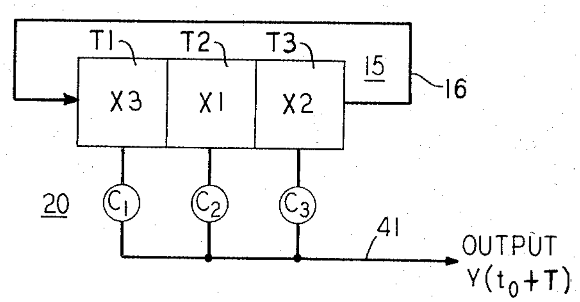
Figure 2C:
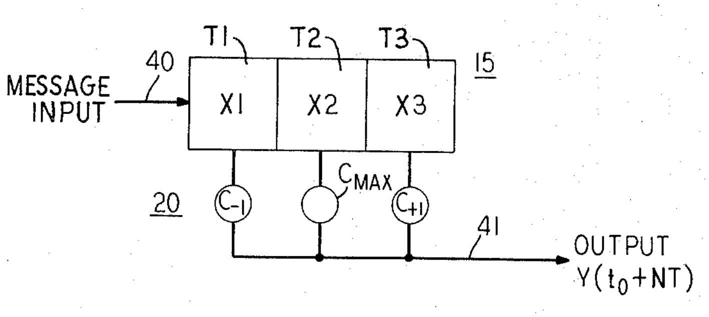

The principle of cyclic equalization is illustrated in FIGS. 2A, 2B, and 2C. Each figure shows a three-tap delay line 15 with symbol delays of T. The test word is applied initially at input 40. The tap outputs are selectively attenuated in adjustable networks 20 (shown as circles) and combined on output lead 41. The feedback control arrangement by which output 41 is compared with an ideal reference and the attenuators adjusted according to the known mean-square algorithm is not shown.

In FIG. 2A, attenuators C1, C2, and C3 have been set to a common minimum value until the delay-line length word pattern has been stored in the delay line cells T1, T2, and T3 as the sequence X1, X2, X3. At this time $t_0$ the first correlation is made with the ideal reference word which has undistorted elements Q1, Q2 and Q3 in that order but not word synchronized with the received distorted sequence. There is bit synchronization present but not frame or word synchronization. At time $t_0$ one or the other of the ideal elements is compared with the received summation on lead 41. If it is the ideal element Q1, nominally corresponding to element X1 in the received sequence, that is sampled, then the equalization process will generate the largest tap coefficient in attenuator C1 at the cell T1 where element X1 in the received pattern is stored. Similarly, if it is the ideal element Q2, nominally corresponding to received element X2, the two patterns will be fortuitously word synchronized and the largest tap coefficient in attenuator C2 will be correctly placed at cell T2 in which received element X2 is stored. Further, if it is the ideal element Q3, nominally corresponding to received element X3, then the correlation will generate the largest tap coefficient in attenuator C3 at cell T3 in which received element X3 is stored.

FIG. 2B shows the received pattern shifted one delay unit to the right either by way of path 16, as shown, after the input has been switched off or disconnected, or by way of a new input so that the element that was formerly in the rightmost cell or the corresponding element in a new word has been transferred to the leftmost cell. Another sample of the ideal pattern is compared with the output on line 41 at time $t_0 + T$. The ideal pattern will have shifted by one delay unit also, so that the sample compared will be the next in line. The resultant processing of the shifting word patterns tends to converge the values of tap coefficients toward an optimum combination which differs from the combination determined at time $t_0$, but whose largest coefficient will remain at the same location. In succeeding time intervals the received and ideal elements will continue to be compared, e.g., at time $t_0 + 2T$ the order of received elements in delay line 15 will be X2, X3, X1. Finally, after a sufficient number of iterations the set of tap coefficients stored in attenuators 20 will be optimized. Whatever the relationship of the received to the ideal pattern a set of properly ordered tap coefficients will result from the above operations.

FIG. 2C shows the state of delay line 15 at the $N^{th}$ circulation after the cap coefficients have been optimized. The amplitudes of the tap coefficients are measured and the greatest of them is aligned with the reference tap on the delay line. Thereafter, the message signal replaces the test signal on lead 40 and the recirculation means 16 is removed.

The three-tap example of FIGS. 2A, 2B, and 2C is oversimplified for explanatory purposes. A three-element test sequence is not sufficiently random for practical use. However, pseudorandom sequences of length 15 or 31 have been found to be satisfactory when employed with equalizers having 15 and 31 taps, respectively, even for highly distorted channels.

With the preceding explanation of the principle of the invention in mind, the operation of the circuit of FIG. 1 can be readily understood. In addition to the conventional equalizer elements enumerated above FIG. 1 includes switches 14, 27, and 33, each having alternative positions A and B. Switches 14 and 33 are optional depending on the mode of operation desired. Position A of all switches yields the known adaptive equalizer which develops a tap-adjusting error signal from the difference between the actual output on lead 23 of delay line 15 at summer 22 and a normalized sliced signal output from slicer 26. In position A of switch 14, delay line 15 is loaded with one pattern length of the pseudorandom word transmitted from word generator 10 and received over channel 13 at the transmission rate determined by data clock 34. In position B, switch 14 disconnects the input of delay line 15 from channel 13 and closes a recirculating loop between the output of delay element 15C and the input to delay element 15A by way of path 16. Advance line 17 to delay line 15 and local pseudorandom word generator 36 at the same time may be switched in position B of switch 33 from data clock 34 to high-speed clock 35, which may operate at several hundred or even a thousand times the speed of data clock 34. Switch 27 is position B transfers one input of difference amplifier 28 from the output of signal slicer 26 to the output of local word generator 36 by way of lead 29. The equalizer now applies a mean-square error adjustment criterion with respect to an ideal rather than an estimated reference.

In one aspect the invention is practiced with switch 27 in position B and switches 14 and 33 in position A (or the circuit constructed equivalently without switches 14 and 33). In this aspect consecutive test words are compared without word synchronization at the normal data transmission rate. Inasmuch as the word periods are identical to the overall delay period of delay line 15, equalization is achieved in very few word lengths. The tap coefficients are adjusted in a way which causes the output of summer 22 to match closely the ideal reference sequence from local word generator 36. In this aspect random noise contamination of the received word sequence tends to average out to a minimum value.

In another aspect the invention is practiced with switches 14 and 27 in position B and switch 33 in position A (or the circuit constructed with data clock 34 as the only timing generator). In this aspect delay line 15 is made reentrant after the first complete received word has been entered, i.e., a ring circuit is formed over lead 16 such that the output of delay unit 15C is looped back to the input of delay unit 15A. The single received test word is then repeatedly compared with the reference test word to achieve equalization. There is a slight noise penalty in this aspect over the use of consecutive received words, but it is tolerable because the principal objective of the fast start-up is to achieve an open data eye as quickly as possible and not necessarily to obtain optimum equalization.

In a further aspect the invention is practiced with all of switches 14, 27 and 33 in position B. In this aspect as soon as one complete word has been stored in delay line 15, the reentrant loop through lead 16 is closed. By reason of switch 33 advance line 17 is now provided with an accelerated sampling wave and the comparison of the received and reference test words is effected at a high recirculation rate unrelated to the normal data rate. Equalization is thus realized in little longer than the storage time for one test word length.

During equalization at either the normal or accelerated rate attenuators 20 are free to assume new values. These values are obtained by applying the error difference between the summed tap outputs at adder 22 and samples of the locally generated test sequence from generator 36 through sensitivity control 31 over line 32 to correlators 25 to which tap samples over leads 19 are also applied. The tap coefficients are also effectively stored in integrators 24 either as voltages on a capacitor or as counts in a counter.

Provision can be made, as indicated in FIG. 1 by dashed line 39, to circulate these stored values at the prevailing clock rate under control of maximum detector 45, connected by lead 46 to the output of reference integrator 24B to which the largest tap coefficient is to be shifted. When the greatest signal occurs at the output of the reference integrator, the circulation is stopped. The tap coefficients are then properly aligned with the taps on delay line 15 so that leading and lagging echoes of received data signals can be properly compensated. The maximum coefficient can be located in one shift cycle and alignment can take place in a second cycle. Because of this shifting of tap coefficients, this invention is denominated cyclic equalization.

Sensitivity control 31 is provided to determine the magnitude of the error difference to be correlated. The lower the setting of control 31, the more precisely can the equalization be optimized. However, lower settings also extend settling times for a given initial distortion. Switches 14 (if used) 27 and 33 (if used) are restored to position A and message data from message data source 11 is transmitted at the normal clock rate. Adaptive equalization in a fine mode using the quantized output of signal slicer 26 as the reference in place of the local test sequence from generator 36 is now performed to reduce residual distortion further and to track slowly occuring channel variations.

An alternative way to achieve cyclic equalization is shown in FIG. 3. The arrangement of FIG. 3 is particularly advantageous where the type of delay line storage largely precludes rapid recirculation. Delay line 15 shown in FIG. 3 may be of the capacitive type in which the storage time is relatively brief. The pseudorandom test sequence once stored in the delay line of FIG. 3 remains stationary. Taps 18A, 18B, and 18C, assuming a simple three-tap equalizer for clarity, are not fixedly connected to their associated attenuators 20, but rather through synchronized switches which are preferably electronic because of the speeds involved. They are shown conceptually in the drawing as mechanical switches on a common shaft. Thus, each selector has one rotatable input contact arm 43 and a plurality of output contacts designated A, B, and C. All output contacts A are connected to bus 44A; contacts B, to bus 44B; and contacts C, to bus 44C. These buses, in turn are connected to the inputs of adjustable attenuators 20A, 20B, and 20C, respectively. The outputs of attenuators 20 on leads 21A, 21B, and 21C extend to summation and correlation circuits of the type shown in FIG. 1. Movable contact arms 43A, 43B, and 43C are synchronized through connection 42, which in turn can be rotated at normal clock and higher speeds by means not specifically shown in FIG. 3.

As soon as the complete test sequence is stored in delay units 15 in FIG. 3, all tap coefficients having been preset to equal values to avoid any bias toward a particular tap as a reference, equalization begins. The correct data flow to the summing amplifier is simulated by cyclic rotation of the tap connections. As the switches rotate, the test sequence appears successively at the input of each attenuator 20. This operation produces the same effect as though the test sequence itself were circulated through the delay line.

FIG. 3 also shows maximum detector 45, which monitors all tap coefficients of attenuators 20. When the maximum is found, synchronizing connection 42 can be stopped in a position which locates the maximum coefficient at the reference tap 18B. A similar detector may be used with the arrangement of FIG. 1 to locate the greatest tap coefficient.

While this invention has been disclosed by way of specific illustrative embodiments, its scope is not intended to be limited thereby as its principle is susceptible of implementation in many other ways as will be apparent to one skilled in the equalizer art.

What is claimed is:

1. In combination with a distorting transmission medium and a synchronous data transmission system a transversal equalizer having a delay line portion with equally spaced taps therealong, an adjustable attenuator for each such tap including a reference tap, and a summing circuit for selectively attenuated tap outputs:

means for achieving fast initial adjustment of said attenuators from a preset substantially equal value condition comprising matching pseudorandom word generators associated respectively with the transmitting end of said medium and with said equalizer, the number of bits in each pseudorandom word being identical and equal to the number of taps on said delay line, means for comparing the output of said summing circuit with said matching word in the output of the generator associated with said equalizer to derive an error signal, means for correlating said error signal with signals at the inputs to said attenuators for establishing an order set of gain coefficients for said attenuators, mean for measuring the largest of said gain coefficients, and means for cyclically shifting said gain coefficients to align the largest such coefficient with said reference tap.

2. The combination defined in claim 1 in which said circulating means comprises a plurality of synchronized switches for group sequentially connecting each of the taps on said delay line to said adjustable attenuators.

3. In combination with a distorting transmission medium and a synchronous data transmission system a transversal equalizer having a delay line portion with equally spaced taps therealong, an adjustable attenuator for each such tap including a reference tap, and a summing circuit for selectively attenuated tap outputs:

means for achieving fast initial adjustment of said attenuators comprising matching pseudorandom word generators associated respectively with the transmitting end of said medium and with said equalizer, the number of bits in each pseudorandom word being identical and equal to the number of taps on said delay line, means responsive to the storing of one complete word which has traversed said transmission medium in said delay line for repeatedly circulating said stored word relative to the inputs to said adjustable attenuators, means for comparing said circulating word in the output of said summing circuit with said matching word in the output of the generator associated with said equalizer to derive an error signal, means for correlating said error signal with signals at the inputs to said attenuators for establishing an ordered set of gain coefficients for said attenuators, means for measuring the largest of said gain coefficients, and means for cyclically shifting said gain coefficients to align the largest such coefficient with said reference tap.

4 The combination defined in claim 3 also comprising first clock means operating at said synchronous data rate for timing in common the word generator associated with said equalizer and said circulating means.

5. The combination defined in claim 4 further comprising second clock means operating at a rate different from said synchronous data rate for timing in common the word generator associated with said equalizer and said circulating means, and means for switching between said first and second clock means upon storing one complete transmitted word in said delay line.

6. The combination defined in claim 3 in which said circulating means comprises a feedback connection between the tap of greatest delay and the input of said delay line.

7. Apparatus for obtaining rapid initial convergence of the gain settings in a transversal equalizer including a tapped delay line, an adjustable attenuator for each tap and a summation circuit based on the minimization of the mean-square error between identical pseudorandom binary test and reference patterns, one of which has traversed a distorting transmission medium, comprising means for generating said identical patterns as a periodic sequence having the same number of binary elements per period as there are taps on said delay line at the synchronous transmission rate of said medium without prior pattern synchronization, means for storing one period of the transmitted test pattern in said delay line, means for iteratively circulating the stored pattern from output to input of said delay line and generating the reference pattern at a rate substantially higher than said synchronous rate, means for comparing said stored and reference patterns with each other element by element at the output of said summation circuit to obtain an error signal, means for correlating said error signal with samples of the transmitted pattern at the several taps on said delay line to furnish control signals for adjusting attenuators associated with said taps, means for adjusting responsive to said control signals said attenuators until said error signal is minimized, means for measuring the values of the gain coefficients effective at said attenuators to identify the largest such coefficient, and means for cyclically shifting the gain coefficients characterizing the adjustments of said attenuators relative to the taps on said delay line so that the largest gain coefficient is effective at the tap designated as a reference tap.

8. A method for obtaining rapid initial convergence of the gain settings in a transversal equalizer including a tapped delay line, an adjustable attenuator for each tap and a summation circuit based on the minimization of the mean-square error between identical binary test and reference patterns, one of which was traversed a distorting transmission medium, comprising the steps of generating said identical patterns as a periodic sequence having the same number of elements per period as there are taps on said delay line but without first synchronizing said patterns, comparing said patterns element by element at the output of said summation circuit to obtain an error signal, correlating said error signal with samples of the transmitted pattern at the several taps on said delay line to furnish control signals for adjusting attenuators associated with said taps, adjusting responsive to said control signals said attenuators until said error signal is minimized, measuring the gain coefficients applied to said attenuators to identify the largest such coefficient, and cyclically shifting the gain coefficients characterizing the adjustments of said attenuators relative to the taps on said delay line so that the largest gain coefficient is effective at the tap designated as a reference tap.

9. A method for obtaining rapid initial convergence of the gain settings in a transversal equalizer including a tapped delay line, an adjustable attenuator for each tap and a summation circuit based on the minimization of the mean-square error between identical binary test and reference patterns, one of which has traversed a distorting transmission medium, comprising the steps of generating said identical patterns as a periodic sequence having the same number of elements per period as there are taps on said delay line and at the synchronous transmission rate of said medium, storing one period of the transmitted test pattern in said delay line, iteratively circulating the stored pattern from output to input of said delay line and generating the reference pattern at a rate substantially higher than said synchronous rate, comparing said patterns element by element at the output of said summation circuit to obtain an error signal, correlating said error signal with samples of the transmitted pattern at the several taps on said delay line to furnish control signals for adjusting attenuators associated with said taps, adjusting responsive to said control signals said attenuators until said error signal is minimized, measuring the gain coefficients effective at said attenuators to identify the largest such coefficient, and cyclically shifting the gain coefficients characterizing the adjustments of said attenuators relative to the taps on said delay line so that the largest gain coefficient is effective at the tap designated as a reference tap.

* * * * *